(12) United States Patent
Raitt

(10) Patent No.: US 10,711,434 B2
(45) Date of Patent: Jul. 14, 2020

(54) BALANCED SEDIMENT THROUGHPUT RESERVOIR DREDGING

(71) Applicant: Douglas Raitt, Aurora, CO (US)

(72) Inventor: Douglas Raitt, Aurora, CO (US)

(*) Notice: Subject to any disclaimer, the term of this patent is extended or adjusted under 35 U.S.C. 154(b) by 125 days.

(21) Appl. No.: 16/150,640

(22) Filed: Oct. 3, 2018

(65) Prior Publication Data

US 2019/0234046 A1 Aug. 1, 2019

Related U.S. Application Data

(60) Provisional application No. 62/628,574, filed on Feb. 9, 2018, provisional application No. 62/625,128, filed on Feb. 1, 2018.

(51) Int. Cl.

| E02F 5/28 | (2006.01) |
|---|---|
| E02B 3/10 | (2006.01) |
| E02B 8/02 | (2006.01) |
| E02F 7/02 | (2006.01) |
| E02F 9/08 | (2006.01) |
| E02F 9/20 | (2006.01) |
| E02B 3/02 | (2006.01) |
| G06Q 10/00 | (2012.01) |

(52) U.S. Cl.
CPC ............... *E02F 5/28* (2013.01); *E02B 3/023* (2013.01); *E02B 3/10* (2013.01); *E02B 8/02* (2013.01); *E02F 7/02* (2013.01); *E02F 9/08* (2013.01); *E02F 9/2045* (2013.01); *G06Q 10/00* (2013.01)

(58) Field of Classification Search
CPC .... E02F 5/28; E02B 3/023; E02B 3/10; E02B 8/02; E02B 7/02

USPC ........................................ 37/342; 405/52, 73
See application file for complete search history.

(56) References Cited

U.S. PATENT DOCUMENTS

| 775,255 | A | * | 11/1904 | Sewall et al. | ......... | E02F 3/9231 |
| | | | | | | 37/326 |
| 886,390 | A | * | 5/1908 | Moninghoff | .............. | E02F 3/92 |
| | | | | | | 37/320 |
| 2,688,461 | A | * | 9/1954 | Simpson | ................. | E02B 13/02 |
| | | | | | | 251/147 |
| 4,264,105 | A | * | 4/1981 | Thompson | ................ | E02F 3/88 |
| | | | | | | 209/156 |
| 2002/0146286 | A1 | * | 10/2002 | Tsuchiya et al. | ....... | E02B 3/023 |
| | | | | | | 405/107 |
| 2010/0111608 | A1 | * | 5/2010 | Detering | ................ | E02B 3/023 |
| | | | | | | 405/74 |

FOREIGN PATENT DOCUMENTS

JP 05331827 A * 12/1993

* cited by examiner

*Primary Examiner* — Tara Mayo-Pinnock
(74) *Attorney, Agent, or Firm* — Leyendecker & Lemire, LLC

(57) ABSTRACT

A system for excavating sediment deposits from water storage reservoirs that equalizes the mass flow of sediment entering the reservoir with the sediment mass in the combined discharge from a dredge and the reservoir outlet system to the downstream water course. One or more remote instrument stations located on the inflow streams to the reservoir collect data that is used by the dredge control system to adjust the mass flow output from the dredge using data collected from the remote reservoir outlet instrumentation located downstream of the reservoir.

20 Claims, 4 Drawing Sheets

BALANCED SEDIMENT THROUGHPUT RESERVOIR DREDGING

RELATED APPLICATIONS

This application claims priority to and incorporates fully by reference U.S. provisional patent applications No. 62/625,128 and 62/628,574 both entitled Balanced Sediment Throughput Reservoir Dredging filed on Feb. 1, 2018 and Feb. 9, 2018 respectfully.

BACKGROUND

Man-made reservoirs have been used from the earliest eras of civilization to store water for consumption, irrigation and control of downstream flows for flood control purposes.

Sediment transport in streams and rivers is a natural process that occurs continuously as water flows in a stream channel. The sediment flows consist of suspended particles that are conveyed in the water column due to turbulence in the water. Bed load sediment particles are conveyed along the bottom of the water channel because of the shear stress caused by the vertical velocity gradient of the water column. Sediment in streams and rivers reservoirs originates in the runoff from upstream watersheds. The concentration of the sediment in the water course is a function of the acreage, the nature of the ground cover, the average slope of the land, the degree of land disturbance, and the volume and intensity of precipitation on that watershed.

When a barrier is placed in a water course the flow of sediment downstream is blocked. The pool of water that is created upstream of the barrier causes the average water velocity to be reduced which in turn reduces the sediment carrying capacity of the flow. The rate of accumulation varies for each reservoir, but sediment always accumulates in the upstream pool which continuously reduces the storage capacity of the reservoir. When the sediment accumulates to a significant amount the original purpose of the reservoir may become impaired and ultimately retirement of the facility will be required.

Sediment deposits in reservoirs may be managed to restore enough capacity for the facility to maintain serviceability. An economic method for sediment removal that has been in use for many years employs dredging. Typically, the process includes the excavation of submerged sediment deposits with a dredge and transport of the sediment and water slurry in a pressurized pipeline to a designated disposal area. This process utilizes a floating vessel that has a movable cutterhead attached to a motorized pump that mixes excavated sediment with reservoir water creating a slurry for transport via a floating pipeline to a designated disposal area. Disposal areas have traditionally been in confined disposal areas located on either upland acreage, downstream acreage or in open water reaches of the reservoir suitable for filling.

The slurry that is directed into disposal areas produces a deposit of saturated sediment and a discharge of effluent that can be high in suspended solids. Active or passive removal of sediment solids from the process effluent is typically required to meet discharge water quality requirements. Disposal of settled sediment is subject to regulation by Local, State and Federal Authorities. Significant studies to assess the suitability of the disposal areas for use are required and considerable expense may be required to secure property that will be utilized for sediment disposal. As the more economic disposal areas are consumed with sediment storage the expense of future sediment disposal increases.

Another consequence of the construction of dams and reservoirs in the stream and river channels is the reduction in sediment flows downstream of the dam. This typically causes the downstream channel to degrade and erode. The quality of the water downstream of the dam will also change. Sediment previously transported in the water column is removed and the clarity of the water increases, which may appear to be beneficial, but, causes a change to the historic environmental conditions for aquatic vertebrates and macroinvertebrates. Over time the changes in the downstream rivers and streams become the accepted condition as popular sport fisheries proliferate in the waters more suited to clear water species.

Out of view from the surface of the impoundment, the accumulated sediment delta progresses towards the dam that is creating the reservoir. Over the service life of the reservoir the deposit ultimately reaches the face of the dam, and given enough time, will render the facility unserviceable to store water or regulate discharges. At this point, retirement, dismantling and removal of the dam may be warranted.

BRIEF DESCRIPTION OF THE DRAWING FIGURES

The novel features believed characteristic of embodiments of the invention are set forth in the appended claims. The embodiments, however, are best understood by reference to the following Detailed Description when read in conjunction with the accompanying drawings, wherein:

Figure 4:
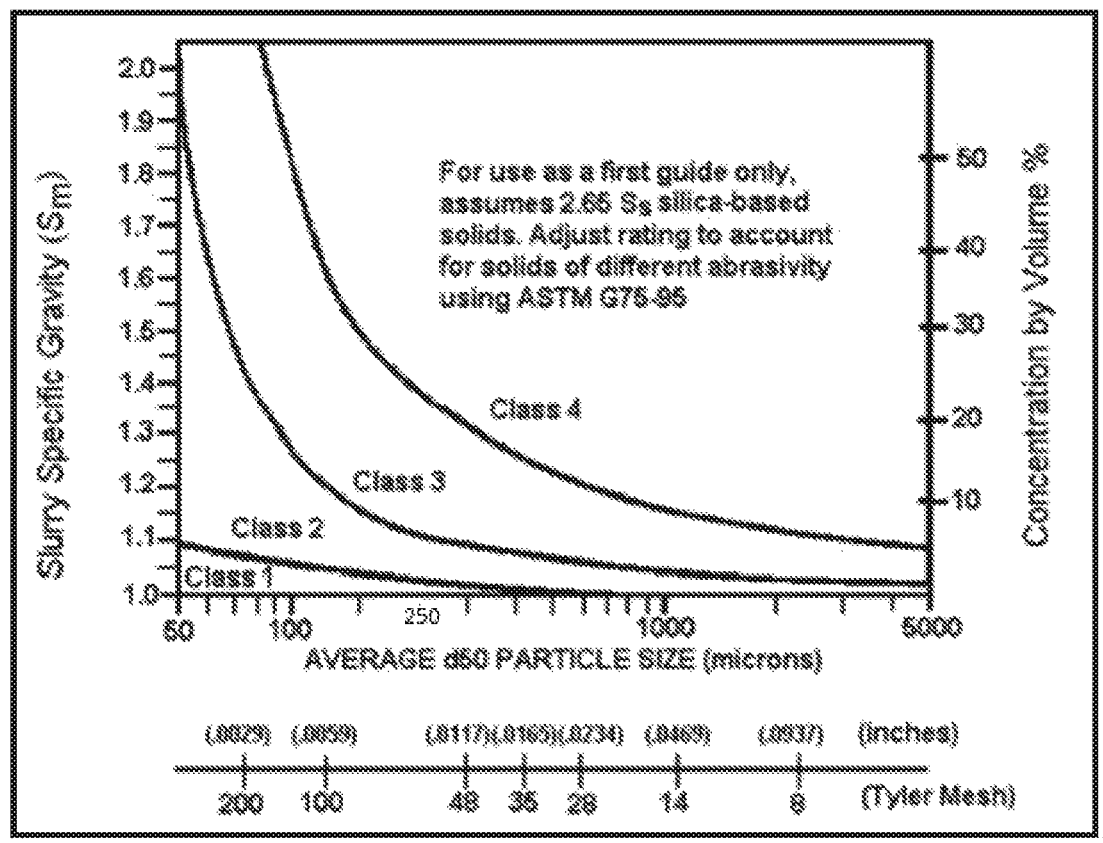

FIG. 4 provides a chart from ANSI HI 12.1-12.6-2016 Rotodynamic (Centrifugal) Slurry Pumps which can be used to determine the appropriate concentration of the dredge slurry based on the properties of the deposit is a flow chart of the relationship of stream flows to sediment transport that can be used by the control system to optimize the rate of sediment removal from the reservoir in an embodiment of the present invention.

Figure 5:
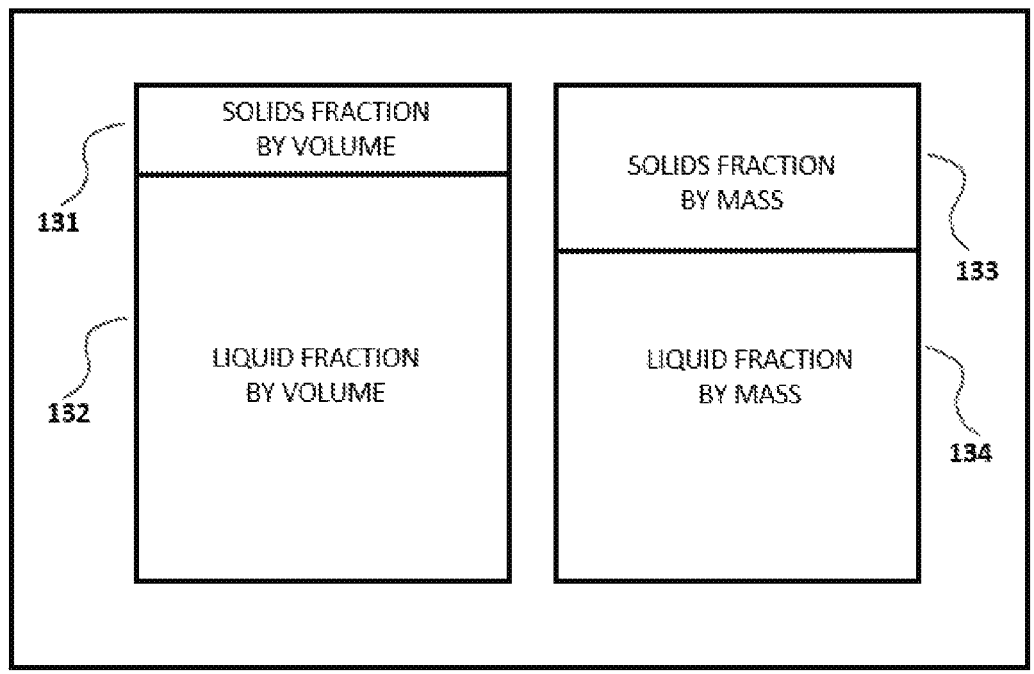
Figure 6:
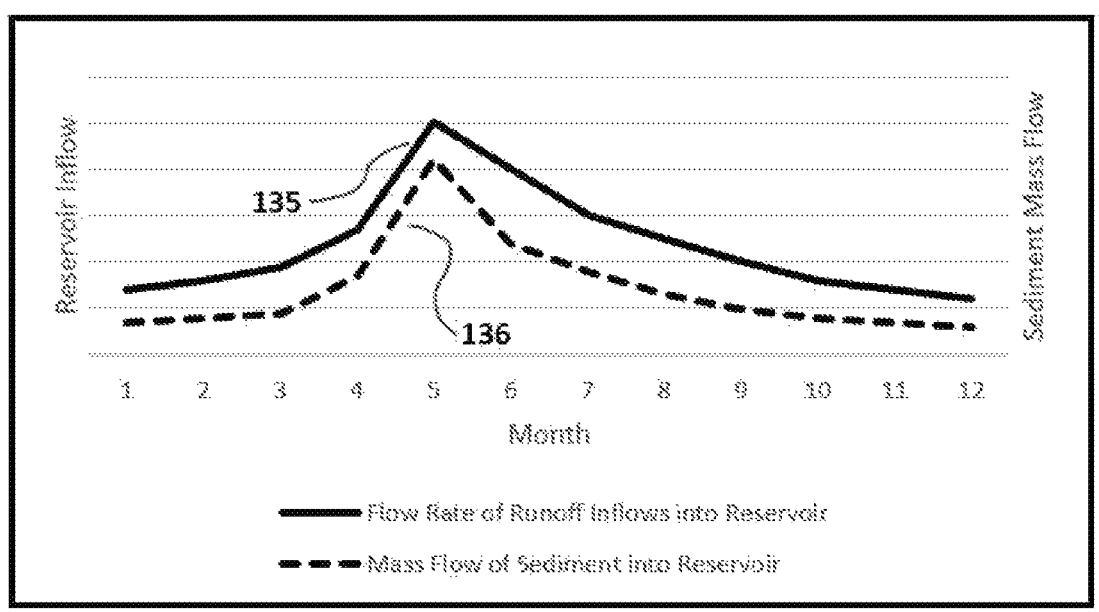

FIG. 5 provides an illustration showing that the volumetric fraction of sediment in the stream flow is less than the mass fraction of solids due to the different respective specific gravities of the solid and liquid in an embodiment of the present invention;

FIG. 6 illustrates a typical annual flow regime with varying seasonal inflows to a reservoir with seasonal variations due to snowmelt and precipitation runoff events as can be encountered and factored into the implementation of an embodiment of the present invention.

DETAILED DESCRIPTION OF THE INVENTION

1. Overview:

Embodiments of a system that reduces the cost of sediment management in reservoirs and extends the life of the facility, thus reducing the economic burden on the owner of the facility and the public, is described. Embodiments of the system further promote the restoration of downstream water course environments to more historically original conditions will improve the health of the ecosystem and benefit the aquatic environment.

One or more of the different embodiments recognize and consider many different considerations. For example, the different embodiments recognize and consider that currently available systems for dredging equipment include controls for adjusting the mass flow rate of the slurry discharged from the dredge.

One or more of the different embodiments recognize that the discharge of sediment slurry from a dredge can normally have a detrimental effect on the ecosystem at the point of discharge and beyond unless the discharged sediment is isolated from the downstream flows due to the uncontrolled sediment concentration of the reservoir system outflow. This is conventionally managed by discharging the dredge pump discharge slurry into a solids settling pond that allows separation of sediment solids from the reservoir outflows.

One or more of the different embodiments recognize and consider that it may be advantageous to have a controlled release of sediment to the downstream water course so that sediment inflows to the reservoir are matched to the combined dredge and normal reservoir outlet sediment outflows. By matching reservoir sediment inflows and outflows the service life of the reservoir can be extended, and the downstream ecosystem restored.

2. The Reservoir System

Figure 1:
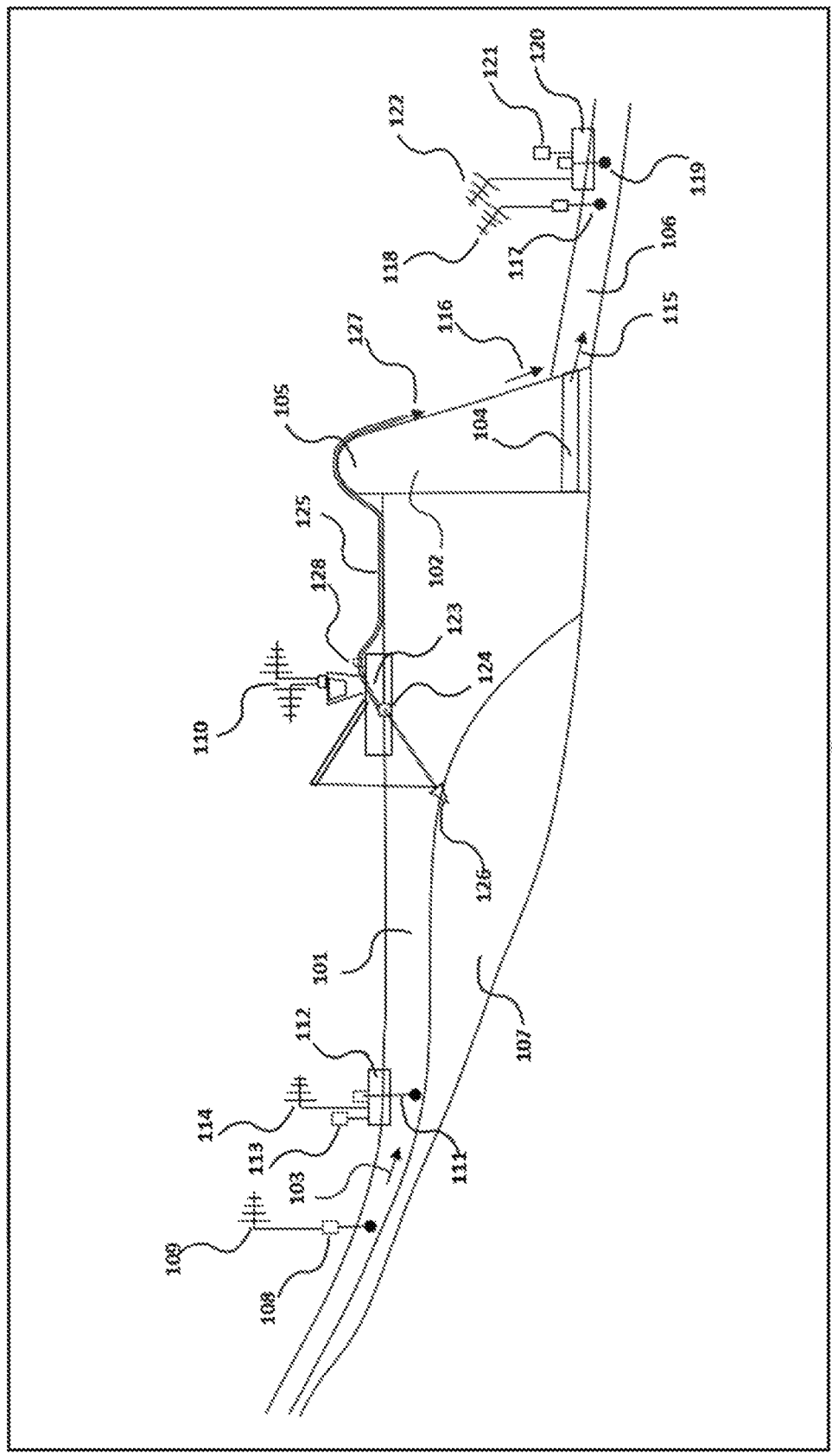
FIG. 1 is an illustration of the reservoir upstream and downstream sediment mass flow monitoring instrumentation systems and the positioning of the dredge and discharge pipeline configuration according to an embodiment of the present invention.

With reference to FIG. 1, an illustration of an embodiment of a system for controlling the mass flow of sediment removed by dredging from a reservoir in an amount equal to the mass inflow of sediment entering the reservoir is depicted. In these illustrative examples, a balanced sediment throughput control system 100 is an example of one environment in which one or more of the different embodiments may be implemented. A water storage reservoir 101 can generally be described as formed upstream of a dam 102 constructed in natural or artificial basin located in or adjacent to a stream, river, or diverted water supply. Reservoirs are constructed for multiple purposes including water storage, recreation, flood control and the distribution of water through diversions to irrigation or raw water supply customers. Inflows 103 to the reservoir are stored for diversion to water consumers and surplus flows are released through the outlet works 104 or over the overflow spillway 105 to the downstream channel 106. The inflow to the reservoir includes surface water runoff and includes components of a sediment flow in both a suspended load and a bed load. The sediment is comprised of organic and inorganic materials that enter the reservoir and settle out in the reservoir as the velocity of the incoming water flow diminishes. The result is an accumulation of a sediment deposit 107 that is retained in the reservoir over time. This deposit continuously reduces the storage capacity of the reservoir and ultimately, without intervention, renders the facility unserviceable.

3. Upstream Sediment Transport and Measurement

The stream flows entering the reservoir include varying amounts of sediment. Each stream flow sediment contribution is dependent on several factors including the volumetric flow rate of the stream or river and the sediment content of the upstream watershed runoff.

The sediment load of each stream flow includes the following components:

Dissolved load

Suspended load (kept in suspension by turbulent flow)

Intermittent suspension (saltation) load (particles that are bounced along the surface of the streambed)

Wash load (finer sediment particles continuously suspended in the stream flow)

Bed load (transported along the stream bed by sliding, rolling or hopping)

The clastic or suspended material includes the components not dissolved in solution and comprise most of the sediment that accumulates in the reservoir pool.

In these illustrative examples, the rate of flow of runoff for each stream flow into the reservoir can be directly measured by a stage recorder or similar stream flow measuring instrument 108. That data can be transmitted via a powered transmitter 109 to a dredge mounted data receiving instrument 110.

A measurement of the amount of particulate sediment in each stream flow entering the reservoir inflow can be indirectly measured using an instrument 111 that measures the suspended solids or turbidity of the water column. This instrument can be a turbidity meter, optical backscatter sensor, acoustic Doppler velocity profiler (ADVP), or a similar instrument that measures the solids content of water in which it is immersed. The output of this instrument can be calibrated to the corresponding suspended solids and bed load carried by the respective stream flow by use of a physical sampling test program utilizing bottle and trap-type samplers.

In these illustrative examples, the instrument used to indirectly measure the sediment load in the selected upstream flow path entering the reservoir can be suspended from an anchored floating pontoon or barge 112. A photovoltaic power supply 113 can be used to provide power to the floating instruments. A transmitter 114 sends the data to the dredge mounted central data receiving instrument 110. Both flow measurement and sediment measuring instruments may be co-located on floating or shore mounted equipment and utilize shared power supply and data transmission devices.

4. Downstream Sediment Transport and Measurement

In these illustrative examples, the flow released downstream from the reservoir is generally equal to the release rate through the outlet works of the reservoir 115 plus the flow released over the spillway of the dam 116. The combined flow rate released downstream from the dam can be measured by a stage recorder 117 located downstream of the dam. An optimum location is selected so that complete mixing of the combined reservoir and dredge system outflows is achieved for accurate inflow solids content matching and so that transmitted signals can be received by the central system controller. That flow rate data can be transmitted via a powered transmitter 118 to a dredge mounted data receiving instrument 110.

In these illustrative examples, the amount of sediment in the downstream flow can be indirectly measured using a device 119 that measures the suspended solids or turbidity of the water column. This can be a turbidity meter, optical backscatter sensor, acoustic Doppler velocity profiler (ADVP), or similar stream flow measuring instrument. The measurements of this instrument can be calibrated to the corresponding suspended solids and bed load carried by the downstream flow with a sampling program that provides direct measurements of sediment loads for the corresponding stream flow rate and instrument reading.

In these illustrative examples, the instrument used to indirectly measure the sediment load in the downstream flow path can be suspended from an anchored floating pontoon or barge 120. A photovoltaic power supply 121 can be used to provide power to the floating instruments. A transmitter 122 can send the collected data to a dredge mounted central data receiving instrument 110.

5. Dredge

According to one or more embodiments, the dredge 123 can be initially positioned in the reservoir at the leading edge of the accumulated sediment deposit. The main dredge pump 124 is started and reservoir water is drawn into the discharge pipeline 125 to prime the system. The rotating cutterhead 126 is lowered into position and the sediment and water mixed slurry is introduced into the pipeline. The slurry is then transported under pressure to the point of discharge downstream of the dam 127. The concentration of the sediment in the slurry can be measured with a non-contact density measurement instrument 128 such as a radiometric non-contact device. The flow rate of the slurry through the dredge pipeline is determined by the operating speed control of the dredge pump. The density or concentration of solids in the slurry can be modulated by adjusting the operating speed of the dredge pump and adjusting added reservoir water to the dredge intake using the dredge operating control system. An optimum slurry concentration is typically targeted based on the pipeline transport capacity and is generally dependent on the particle size distribution of the sediment deposit being excavated. Guidelines such as those found in ANSI HI 12.1-12.6-2016 Rotodynamic (Centrifugal) Slurry can be used to determine the appropriate concentration of the dredge slurry after system requirements are considered.

6. Balancing the Concentration of Sediment in and Out of the Reservoir

The balanced sediment throughput dredging process matches the incoming sediment load with the combined sediment content of spillway flows, outlet works flows, and the direct discharge of the dredge slurry discharge below the dam. Operation of the system can be varied from a continuous process that matches sediment loads at all times to an intermittent process that matches sediment loads over a longer time frame but only operates periodically. This embodiment allows for seasonal constraints on equipment operations or adapting to economic constraints that still allow environmental and regulatory requirements to be satisfied.

Figure 2:
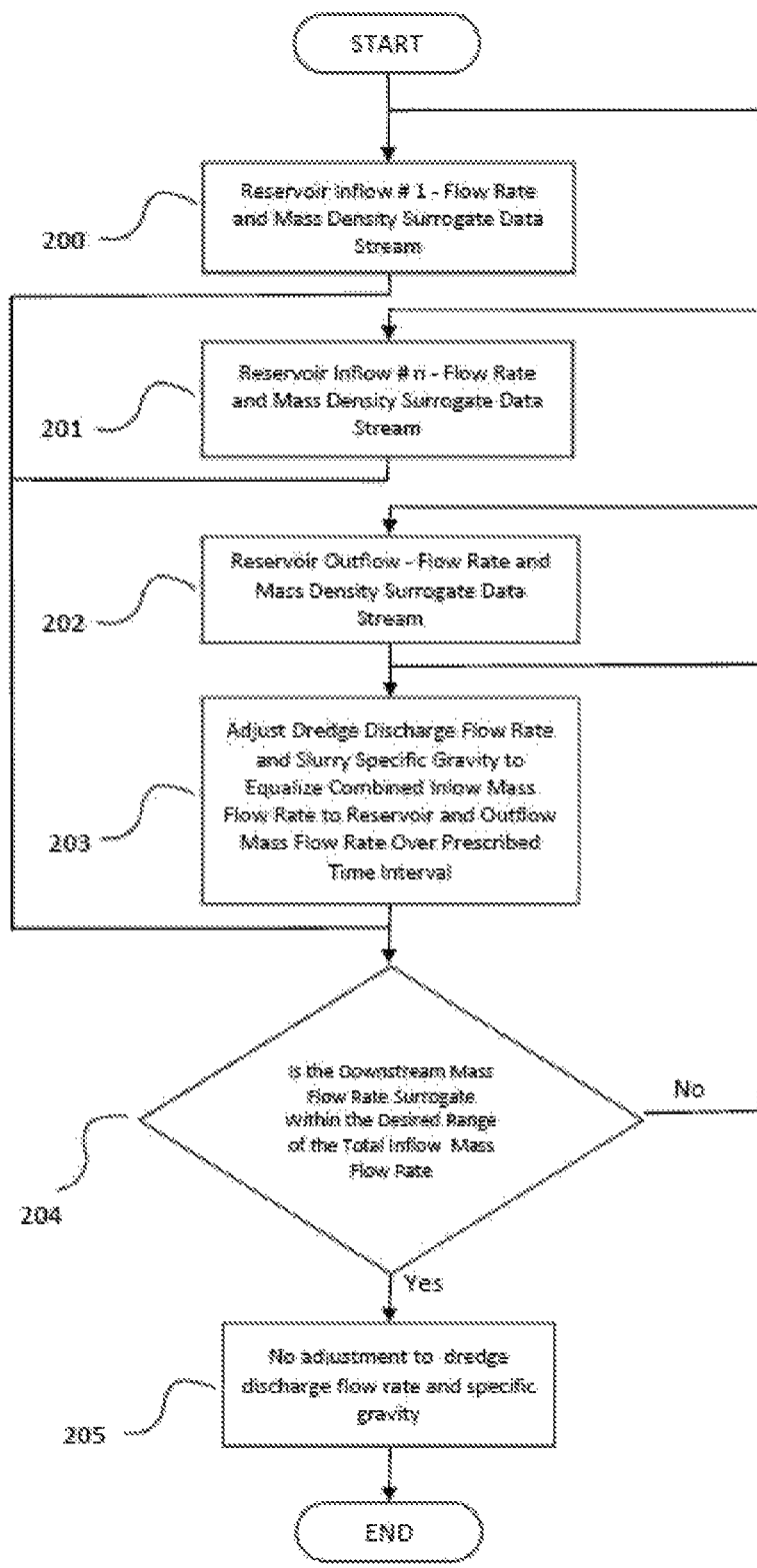
FIG. 2 is a flowchart for a process for controlling the output of a dredge excavating sediment from a reservoir deposit so that upstream and downstream mass flow rates are equalized according to an embodiment of the present invention.

To match the upstream and downstream sediment mass flow rates the dredge operating controls can be configured to adjust the concentration of the slurry pipeline discharge. With reference to FIG. 2, an illustration is provided of a flowchart of a process for controlling the combined mass flow of sediment passing downstream of a reservoir in an amount equal to the sediment mass inflows in accordance with an embodiment.

The process begins with the collection of data from an inflow stream instrument station(s) (operation 200) typically including suspended solids or turbidity of the water column, and stream flow velocity. Inflow stream data can also be collected from additional instrument station sites (operation 201) and the data communicated to the dredge process system controller. This data is aggregated, and a total mass flow of sediment is typically calculated from all the inflow stream data collection sites. The process continues with the collection of data from the downstream instrument station(s) (operation 202) typically including suspended solids or turbidity of the water column, and stream flow velocity. This data is communicated to the dredge process system controller, located either on the dredge or at a remote location.

The data collected from the remote instrument stations is collected by the dredge system controller and a calculation is made to adjust (operation 203) the mass flow rate of sediment that is discharged from the dredge via the discharge pipeline to equalize the reservoir sediment mass inflow to the reservoir mass outflow. The data from the remote instruments stations can then be compared after enough time to allow for conveyance of the discharged slurry to assess if the combined sediment outflow rate is outside the range targeted for the system (operation 204). If the outflow mass flow rate is within the acceptable range, then no system adjustments are required. If the outflow mass flow rate is outside the acceptable range, then the dredge slurry discharge mass flow rate can be modified (operation 205).

The process to determine the target dredging discharge requirements can be as follows:

1. Determine reservoir sediment volume increase for study period. Determine the average density of deposit.
2. Determine the reservoir capture efficiency.
3. Estimate the rate of reservoir sediment inflow and measure the rate of reservoir sediment inflow for various flow rates using an instrument system.
4. Determine estimated rate of reservoir sediment outflow and measure rate of reservoir sediment outflow for various flow rates using an instrument system.
5. Calculate the rate of sediment solids discharge required to match sediment solids inflows to outflows.
6. Determine the concentration of solids in the dredge slurry discharge after considering the properties of the sediment deposit (average particle size and abrasivity).
7. Determine the dredge discharge rate after finalizing the period for equalization of sediment flows (hourly, weekly, annually, etc. . . . ) and operate the dredge using a slurry concentration control system with inputs from the upstream and downstream sediment monitoring instruments.

Figure 3:
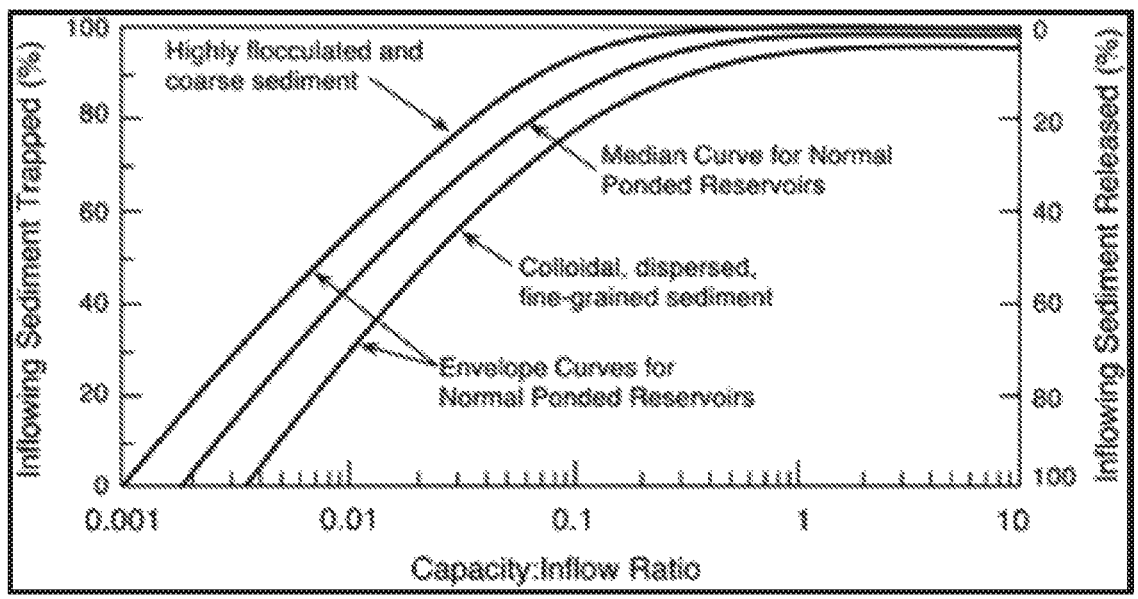
FIG. 3 illustrates the family of curves that provide the expected reservoir sediment capture efficiency as published by Brune. The sediment capture efficiency ratio can be utilized to optimize the equipment selection for sediment removal from the reservoir in an embodiment of the present invention.

An example calculation is provided for a hypothetical reservoir system and is as follows:

1. Sediment volume increase for study period, determine in situ bulk density. The amount of suspended sediment entering the reservoir and deposited can be determined by a bathymetric survey that compares the previous period end surface profile of the reservoir with the current reservoir surface profile. Any removals during the period should be accounted for. Take physical samples of sediment to determine the unit weight of the sediment deposit.
    a. $SED_{per}$ (Period Sediment Accumulation Volume)= $CAP_{now}$ (Current Bathymetric Survey Reservoir Capacity)–$CAP_{prev}$ (Previous Reservoir Capacity)
       Use 40,000 cubic yards (CY) for measured sediment inflow between surveys
    b. P (Duration of Period Between Bathymetric Surveys)
       Use 1 year between surveys
    c. $SEDRATE_{per}$ (Rate of Reservoir Sediment Accumulation for Period)=$SED_{per}$/P=40,000 CY/year
    d. SEDDENSITY (Bulk Density of Reservoir Sediment Deposit)
       Use 85 lb./cubic foot
       Verify with a sediment sampling program.
2. Determine the reservoir capture efficiency. Reservoir sediment deposits are generally correlated to sediment inflows by the size, shape, and ratio of capacity to annual inflow. Various studies have established widely accepted formulaic relationships between reservoir shapes and rates of stream inflow. A specific example is the family of curves that provide expected sediment capture efficiency as published by Brune[1] (FIG. 3). These correlations can be used to estimate long term sediment deposition rates.
  a. Average Reservoir Capacity for Period ($CAP_{per}$)
    Use 7,700 Acre-ft
  b. Average Reservoir Runoff Inflow for Period ($INFLOW_{per}$)
    Use 250,000 Acre-ft/Year
      =250,000 Acre-ft/Year*43,560 cubic feet/Acre-foot/365 days/year/24 hours/day/60 min/hour/60 sec/min=345.3 cubic feet/sec
  c. Capacity Inflow Ratio=$CAP_{per}$/$INFLOW_{per}$
    =7,700 Acre-ft/250,000 Acre-ft/Year=0.0308
  d. Period Trap Efficiency ($EFF_{per}$)
    From Brune Chart for a normal reservoir use 74% trap efficiency
3. Estimate the rate of reservoir sediment inflow and measure the rate of reservoir sediment inflow for various flow rates using an instrument system
  a. Sediment Inflow Rate to Reservoir ($INRATE_{per}$)=SEDRATEper (Rate of Sediment Accumulation for Period)/$EFF_{per}$
    =40,000 CY/Year/0.74=54,054 CY/Year
    =54,054 CY/Year*27 cubic feet/CY/365 days/Year/24 hrs./day/60 min/hr.=2.78 cubic feet/minute
    Also perform physical sediment surveys to determine sediment inflow rates for various stream flow rates
4. Determine estimated rate of reservoir sediment outflow and measure the rate of reservoir sediment outflow for various flow rates using an instrument system
  a. Period Sediment Outflow Rate ($OUTRATE_{per}$)=Sediment Inflow Rate to Reservoir ($INRATE_{per}$)−$SEDRATE_{per}$ (Rate of Reservoir Sediment Accumulation for Period)
    =54,054 cy/year−40,000 cy/year=14,054 cy/year
    =14,054 cy/year*27 cubic feet/cy/365 days/yr./24 hrs./day/60 min/hr.=0.72 cf/min
    Also perform physical sediment surveys to determine sediment outflow rates for various stream flow rates
5. Calculate the rate of sediment solids discharge required to match sediment solids inflows to outflows
  a. Period Average Required Sediment Volumetric Dredge Discharge ($DREDGERATE_{avg}$)=Sediment Inflow Rate to Reservoir ($INRATE_{per}$)−Period Sediment Outflow Rate ($OUTRATE_{per}$)
    =54,054 cy/year−14,054 cy/year=40,000 cy/year=2.05 cf/min
  b. Period Average Required Sediment Weight Dredge Discharge ($DREDGEWTRATE_{avg}$)=Period Average Sediment Dredge Discharge ($DREDGERATE_{avg}$)*SEDDENSITY (Bulk Density of Reservoir Sediment Deposit)
    =2.05 cf/min*85 lb/cf=174.3 lb/min
6. Determine the concentration of solids in the dredge slurry discharge after considering the characteristics of the sediment deposit (particle size and shape)
  a. Target Slurry Solids Volumetric Concentration=(Target Slurry Specific Gravity−1)/(1−Solids Specific Gravity)
    FIG. 4 provides a chart from ANSI HI 12.1-12.6-2016 Rotodynamic (Centrifugal) Slurry Pumps which can be used to determine the appropriate concentration of the dredge slurry based on the properties of the deposit.
    Use average particle size $D_{50}$ of 0.25 mm (250 microns), solids specific gravity of 2.65 and Class 2 slurry pump service class with an average particle abrasivity
    Use Target Slurry Specific Gravity=1.1
    FIG. 5 provides an illustration showing the volumetric fraction of sediment 131 and the volumetric fraction of liquid 132 in the stream flow compared to the mass fraction of solids 133 and the mass fraction of liquid 134 resulting from the different respective specific gravities of the solid and liquid.
    Target Slurry Solids Volumetric Concentration=(1.1−1)/(1−2.65)=0.061=6.1% Solids concentration by volume
7. Select the dredge discharge rate after determining the period for equalization of sediment inflows and outflows (hourly, weekly, annually, etc. . . . ) and operate the dredge using a slurry concentration control system with inputs from the upstream and downstream sediment monitoring instruments.
  a. For continuous dredge operation $DREDGERATE_{per}$ (Period Slurry Pumping Rate)=Period Average Sediment Weight Dredge Discharge ($DREDGEWTRATE_{avg}$)/(Target Slurry Solids Volumetric Concentration %*Solids Specific Gravity*Unit Weight of Water)
    =174.3 lb/min/(0.061*2.65*62.4 lb/cf)=17.3 cf/min
  b. Determine frequency of dredge operation for compliance with budgetary and regulatory constraints
    Use average annual reservoir inflow as the basis of determining balanced throughput (Table 1):

TABLE 1

Dredge Operating Frequency Alternatives

| Frequency | Dredge Operating Parameters | Example Dredge Discharge Rates (6.23 gal per min/cf/min) |
| --- | --- | --- |
| Continuous | 12 Months/Year, 7 Days per Week, 24 Hours/Day | 17.3 cf/min (108 gpm) |
| Partial Week, Multiple Shifts | 12 Months/Year, 6 Days per Week, 2 ea. 10 Hour Shifts/Day | 24.2 cf/min (151 gpm) |
| Seasonal, Partial Week, Multiple Shifts | 8 Months/Year, 6 Days per Week, 2 ea. 10 Hour Shifts/Day | 36.2 cf/min (226 gpm) |
| Seasonal, Partial Week, Single Shift | 8 Months/Year, 6 Days per Week, 1 ea. 12 Hour Shift/Day | 60.4 cf/min (376 gpm) |

With reference to FIG. 6, an illustration of a typical annual flow regime is provided for inflows 135 to a reservoir with seasonal variations due to snowmelt and precipitation runoff events. Conveyed sediment 136 in the form of a clastic or suspended load is transported in varying amounts depending on the velocity of the stream flows. To account for a more closely matching of sediment removal to inflow rates, the dredging discharge rate can be varied. According to these embodiments dredging equipment can be selected and operated using a control system to allow the combined dredged sediment discharge flowrate and reservoir sediment outflow rate to match the reservoir inflow rate and achieve a balanced period throughput (Table 2):

TABLE 1

Dredge Seasonal Operating Alternatives

| Frequency | Dredge Operating Parameters | Example Dredge Discharge Rates (6.23 gal per min/cf/min) |
|---|---|---|
| Seasonal, Partial Week, Multiple Shifts | 8 Months/Year, 6 Days per Week, 2 ea. 10 Hour Shifts/Day | Low flow, ~ 25% of annual average, 9.1 cf/min (56 gpm) |
| Seasonal, Partial Week, Multiple Shifts | 8 Months/Year, 6 Days per Week, 2 ea. 10 Hour Shifts/Day | Higher flow, ~ 400% of annual average, 144.8 cf/min (902 gpm) |

Another operating scenario could provide for an increased amount of sediment discharge beyond the inflow rate measured during the operating period. This could be desired to overcome a previous period of unbalanced sediment inflow and outflow that caused degradation or some undesirable condition in the downstream ecosystem.

The flowcharts and diagrams illustrate the architecture, functionality, and operation of some possible implementations of apparatus and methods in different embodiments. In this regard, each block in the flowchart or diagrams may represent a module, segment, function, and/or a portion of an operation or step. In some alternative implementations, the function or functions noted in the block may occur out of the order noted in the figures.

The embodiments provide methods and apparatus for equalizing sediment inflows and outflows while accomplishing reservoir sediment removal with a dredge. In one embodiment, the method comprises an upstream sediment and fluid flow data collection system, a downstream sediment and fluid flow data collection system, and a system control apparatus on a dredge to control the mass flow output of the dredge.

The description of the different advantageous embodiments has been presented for purposes of illustration and description and is not intended to be exhaustive or limited to the embodiments in the form disclosed. Many modifications and variations will be apparent to those of ordinary skill in the art. Further, the different advantageous embodiments may provide different advantages as compared to other advantageous embodiments. The embodiment or embodiments selected are chosen and described to best explain the principles of the embodiments, the practical application, and to enable others of ordinary skill in the art to understand the disclosure for various embodiments with various modifications as are suited to the use contemplated.

I claim:

1. A water storage system including a dredging system comprising:
a dam for controlling or limiting the flow of water there through from a flowing body of water;
a reservoir located upstream of the dam;
an upstream instrument subsystem located upstream of the reservoir on one or more inflow streams of the flowing body of water and configured to periodically measure at least an upstream liquid flow rate, and an upstream solids content;
a downstream instrument subsystem located downstream of a reservoir on one or more outlet streams of the flowing body of water and configured to periodically measure at least a downstream liquid flow rate, and a downstream solids content;
a dredge configured to remove solid material from a bottom surface of the reservoir at a dredging rate and deposit it (i) downstream of the dam, and (ii) upstream of the downstream instrument subsystem;
a dredge operating control system operatively coupled to the upstream instrument subsystem and the downstream instrument subsystem and configured to (a) receive the periodically measured upstream liquid flow rate, the upstream solids content, the downstream liquid flow rate and the downstream solids content, (b) calculate an upstream solids flow rate using the upstream liquid flow rate and the upstream solids content, (c) calculate a downstream solids flow rate using the downstream liquid flow rate and the downstream solids content, and (d) vary the dredging rate to match the downstream solids flow rate with the upstream solids flow rate within a predetermined range over a predetermined period of time.

2. The water storage system of claim 1, wherein the upstream and downstream solids flow rate are based on the mass of the solids.

3. The water storage system of claim 1, wherein the upstream and downstream solids flow rate are based on the volume of the solids.

4. The water storage system of claim 1 wherein the upstream instrument subsystem includes a first wireless transmitter, the downstream instrument subsystem includes a second wireless transmitter, the dredge operating control system includes a wireless receiver, and the control system is operatively coupled to the upstream instrument subsystem and the downstream instrument subsystem by way of the respective first and second transmitters.

5. The water storage system of claim 1 wherein the upstream instrument subsystem and the downstream instrument subsystem measure upstream water temperature and downstream temperature respectively, and wherein the upstream and downstream water temperatures are utilized by the dredge operating control system in determining an amount to vary the dredging rate.

6. The water storage system of claim 1, wherein the dredge operating control system is located on the dredge.

7. The water storage system of claim 1, wherein the dredge operating control system is located remotely from the dredge and the dredge is operatively coupled to the dredge operating control system.

8. The water storage system of claim 1, wherein the upstream instrument subsystem and the downstream instrument subsystem communicate with the dredge operating control system through a data network.

9. A method of operating a dredging system on a reservoir having a dam and being located on a flowing body of water, the method comprising:
providing the dredge system, the dredge system comprising, a dredge,
an upstream instrument subsystem located upstream of a reservoir on one or more inflow streams of the flowing body of water including an upstream flow meter and an upstream turbidimeter,
a downstream instrument subsystem located downstream of a reservoir on one or more outlet streams of the flowing body of water including a downstream flow meter and a downstream turbidimeter, and
a dredge operating control system operatively coupled to the upstream instrument subsystem and the downstream instrument subsystem;
collecting upstream flow rate data for one or more inflow streams into the reservoir;

collecting upstream solid concentration data for the water in the one or more inflow streams;

collecting downstream flow rate data for one or more outlet streams from the reservoir;

collecting downstream solid concentration data for the water in the one or more outflow streams;

determining an upstream solids flow rate of the one or more inflow streams into the reservoir;

determining a downstream solids flow rate of the one or more output streams from the reservoir; and adjusting a dredging rate of the dredge to match the downstream solids flow rate with the upstream solids flow rate over a predetermined interval of time.

10. The method of claim 9, wherein the upstream and downstream solids flow rates are volumetrically based.

11. The method of claim 9, wherein the upstream and downstream solids flow rates are mass based.

12. The method of claim 9, wherein the upstream instrument subsystem further includes one or more upstream thermometers, further comprising collecting upstream temperature data.

13. The method of claim 12, wherein the downstream instrument subsystem further includes one or more downstream thermometers, further comprising collecting downstream temperature data.

14. The method of claim 9, further comprising wirelessly transmitting upstream flow rate data, upstream solid concentration data, downstream flow rate data, and downstream solid concentration data from the respective upstream instrument subsystem and the downstream instrument subsystem to the dredge operating control system.

15. The method of claim 9, wherein said adjusting a dredging rate of the dredge is controlled by the dredge operating control system.

16. A dredging system for removing solids from a reservoir having at least one inlet stream, a dam and at least one outlet stream, the system comprising:

a dredge;

an upstream instrument subsystem, the upstream instrument subsystem including at least an upstream turbidimeter and an upstream liquid flow meter;

a downstream instrument subsystem, the downstream instrument subsystem including at least a downstream turbidimeter and a downstream liquid flow meter;

a dredge controller operatively coupled to the upstream instrument subsystem and the downstream instrument subsystem, the dredge controller configured to (i) calculate an upstream solids flow rate, (ii) calculate a downstream solids flow rate, and (iii) calculate a dredging rate to match the downstream solids flow rate with the upstream solids flow rate within a predetermined range over a predetermined period of time.

17. The dredging system of claim 16, wherein the upstream instrument subsystem and the downstream instrument subsystem each include wireless transmitters operatively coupled to the dredge controller by way of a wireless receiver associated with the dredge controller.

18. The dredging system of claim 17, wherein the upstream and downstream solids flow rates are mass based.

19. The dredging system of claim 16, wherein the dredge controller is operatively coupled to the dredge and is further configured to vary operation of the dredge to achieve the dredging rate.

20. The dredging system of claim 19, wherein the dredge controller is located remotely from the dredge, includes a transmitter, and is operatively coupled to the dredge wirelessly.

* * * * *